(12) United States Patent
Takahashi et al.

(10) Patent No.: US 12,398,077 B2
(45) Date of Patent: Aug. 26, 2025

(54) DIELECTRIC COMPOSITION AND ELECTRONIC COMPONENT

(71) Applicant: TDK CORPORATION, Tokyo (JP)

(72) Inventors: Tetsuhiro Takahashi, Tokyo (JP); Toshihiro Iguchi, Tokyo (JP); Hiroki Akiba, Tokyo (JP); Ryota Nomura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 580 days.

(21) Appl. No.: 17/945,593

(22) Filed: Sep. 15, 2022

(65) Prior Publication Data

US 2023/0085744 A1    Mar. 23, 2023

(30) Foreign Application Priority Data

Sep. 22, 2021 (JP) ................... 2021-154490
Feb. 4, 2022 (JP) ................... 2022-016585
Jul. 28, 2022 (JP) ................... 2022-120498

(51) Int. Cl.
*C04B 35/495* (2006.01)
*C04B 35/626* (2006.01)
*C04B 35/634* (2006.01)
*C04B 35/638* (2006.01)
*C04B 35/64* (2006.01)
*H01G 4/12* (2006.01)
*H01G 4/30* (2006.01)

(52) U.S. Cl.
CPC ........ *C04B 35/495* (2013.01); *C04B 35/6262* (2013.01); *C04B 35/6264* (2013.01); *C04B 35/62695* (2013.01); *C04B 35/63416* (2013.01); *C04B 35/638* (2013.01); *C04B 35/64* (2013.01); *H01G 4/1227* (2013.01); *C04B 2235/3206* (2013.01); *C04B 2235/3239* (2013.01); *C04B 2235/3244* (2013.01); *C04B 2235/3255* (2013.01); *C04B 2235/3258* (2013.01); *C04B 2235/3262* (2013.01); *C04B 2235/3418* (2013.01); *C04B 2235/604* (2013.01); *C04B 2235/606* (2013.01); *C04B 2235/6567* (2013.01); *C04B 2235/6582* (2013.01); *C04B 2235/662* (2013.01); *H01G 4/30* (2013.01)

(58) Field of Classification Search
CPC ................... C04B 35/495; H01G 4/30
See application file for complete search history.

(56) References Cited

U.S. PATENT DOCUMENTS

| 11,873,295 B2* | 1/2024 | Anderson | ............ C07D 405/12 |
| 2012/0264025 A1* | 10/2012 | Suto | ............ H01M 10/36 |
| | | | 429/405 |
| 2015/0023857 A1* | 1/2015 | Armiento | ............ G16C 20/30 |
| | | | 703/2 |

FOREIGN PATENT DOCUMENTS

JP     2000-103671 A    4/2000

* cited by examiner

*Primary Examiner* — Christopher A Fiorilla
(74) *Attorney, Agent, or Firm* — Oliff PLC

(57) ABSTRACT

Provided is a dielectric composition containing: a main component expressed by $\{Ba_xSr_{(1-x)}\}_mTa_4O_{12}$; and a first subcomponent, m satisfying a relationship of $1.95 \leq m \leq 2.40$. The first subcomponent includes silicon and manganese. When the amount of the main component contained in the dielectric composition is set to 100 parts by mole, the amount of silicon contained in the dielectric composition is 5.0 to 20.0 parts by mole in terms of $SiO_2$, and the amount of manganese contained in the dielectric composition is 1.0 to 4.5 parts by mole in terms of MnO.

7 Claims, 2 Drawing Sheets

DIELECTRIC COMPOSITION AND ELECTRONIC COMPONENT

BACKGROUND OF THE INVENTION

Priority is claimed to Japanese Patent Applications No. 2021-154490 filed on Sep. 22, 2021, No. 2022-016585 filed on Feb. 4, 2022, and No. 2022-120498 filed on Jul. 28, 2022, the disclosure of which is incorporated by reference in its entirely.

1. Field of the Invention

The present invention relates to a dielectric composition and an electronic component.

2. Description of the Related Art

For example, as disclosed in JP 2000-103671 A, a dielectric composition having a high specific dielectric constant without containing lead or an alkali metal has been developed.

However, a novel dielectric composition that is being newly developed has a problem that a high-density dielectric substance is not obtained when not being fired at a high temperature.

SUMMARY OF THE INVENTION

The present invention has been made in consideration such circumstances, and an object thereof is to provide a novel dielectric composition in which a high sintering density is obtained even when being fired at a relatively low temperature, and a specific dielectric constant is high.

According to a first aspect of the present invention, there is provided a dielectric composition containing: a main component expressed by $\{Ba_xSr_{(1-x)}\}_mTa_4O_{12}$; and a first subcomponent, wherein m satisfies a relationship of 1.95 m 2.40, the first subcomponent includes silicon and manganese, the amount of silicon contained in the dielectric composition is 5.0 to 20.0 parts by mole in terms of $SiO_2$, and the amount of manganese contained in the dielectric composition is 1.0 to 4.5 parts by mole in terms of MnO, provided that the amount of the main component contained in the dielectric composition is set to 100 parts by mole.

The dielectric composition according to the first aspect of the present invention has a high sintering density and a high specific dielectric constant even when being fired at a relatively low temperature (for example, 1200° C. to 1355° C.). The reason for this is not necessarily certain, but the following reason is considered. When m is within the above-described range, and a predetermined amount of silicon and manganese is contained in the dielectric composition, it is considered that an operation of lowering a sintering initiation temperature is obtained. According to this, it is considered that even when being fired at a relatively low temperature, the high sintering density is easily obtained, and the specific dielectric constant is also improved.

It is preferable that m satisfies a relationship of 2.10≤m≤2.40. According to this, it is considered that an effect of improving wettability between the main component and the first subcomponent and lowering the sintering initiation temperature is obtained. According to this, even at a low temperature, a higher sintering density is obtained and the specific dielectric constant is further improved.

Preferably, the dielectric composition further contains at least one selected from the group consisting of vanadium, magnesium, zirconium, and tungsten as a second subcomponent, the at least one selected from the group consisting of vanadium, magnesium, zirconium, and tungsten is contained in the dielectric composition in an amount of 0.25 to 1.0 parts by mole in terms of a predetermined oxide, provided that the amount of the main component contained in the dielectric composition is set to 100 parts by mole, the amount of vanadium is an amount in terms of $V_2O_5$, the amount of magnesium is an amount in terms of MgO, the amount of zirconium is an amount in terms of $ZrO_2$, and the amount of tungsten is an amount in terms of $WO_3$.

When the second subcomponent is contained in the dielectric composition within the above-described range, the sintering initiation temperature is further lowered. According to this, the sintering density is further improved, and the specific dielectric constant is further improved. In addition, when the second subcomponent is contained in the dielectric composition within the above-described range, an effect of improving resistance to reduction is obtained. As a result, a specific resistance is further improved.

According to second aspect of the present invention, there is provided a dielectric composition containing: a main component expressed by $\{Ba_xSr_{(1-x)}\}_mTa_4O_{12}$; and a first subcomponent, m satisfies a relationship of 1.95≤m≤2.40, the first subcomponent includes silicon and manganese, the amount of silicon contained in the dielectric composition is 5.0 to 20.0 parts by mole in terms of $SiO_2$, and the amount of manganese contained in the dielectric composition is 5.0 to 40.0 parts by mole in terms of MnO, provided that the amount of the main component contained in the dielectric composition is set to 100 parts by mole.

The dielectric composition according to the second aspect of the present invention has a high sintering density and a high specific dielectric constant even when being fired at a relatively low temperature (for example, 1150° C. to 1250° C.). The reason for this is not necessarily certain, but the following reason is considered. When m is within the above-described range, and a predetermined amount of silicon and manganese is contained in the dielectric composition, it is considered that an operation of lowering the sintering initiation temperature is obtained. According to this, it is considered that even when being fired at a relatively low temperature, the high sintering density is easily obtained, and the specific dielectric constant is also improved.

It is preferable that m satisfies a relationship of 2.10≤m≤2.40. According to this, it is considered that the effect of improving wettability between the main component and the first subcomponent and lowering the sintering initiation temperature is obtained. According to this, even at a low temperature, a higher sintering density is obtained and the specific dielectric constant is further improved.

Preferably, the dielectric composition further contains at least one selected from the group consisting of vanadium, magnesium, zirconium, tungsten, and a rare-earth element as a second subcomponent, the at least one selected from the group consisting of vanadium, magnesium, zirconium, tungsten, and a rare-earth element is contained in the dielectric composition in an amount of 0.25 to 10.0 parts by mole in terms of a predetermined oxide, provided that the amount of the main component contained in the dielectric composition is set to 100 parts by mole.

the amount of vanadium is an amount in terms of $V_2O_5$,
the amount of magnesium is an amount in terms of MgO,
the amount of zirconium is an amount in terms of $ZrO_2$,
the amount of tungsten is an amount in terms of $WU_3$, and
the amount of rare-earth element expressed by RE is an amount in terms of $RE_2O_3$.

When the second subcomponent is contained in the dielectric composition within the above-described range, the sintering initiation temperature is further lowered. According to this, the sintering density is further improved, and the specific dielectric constant is further improved. In addition, when the second subcomponent is contained in the dielectric composition within the above-described range, an effect of improving resistance to reduction is obtained. As a result, a specific resistance is further improved.

It is preferable that the dielectric composition according to the present invention substantially does not contain niobium, an alkali metal, and lead.

Examples of the dielectric composition exhibiting a high specific dielectric constant include $(Sr, Ba)Nb_2O_6$ containing niobium as a main component, $(Na, K)NbO_3$ containing an alkali metal, and $Pb(Zr, Ti)O_3$ containing lead.

The dielectric composition according to the present invention substantially does not contain niobium, and thus an oxygen defect is less likely to occur. In other words, a variation in valence is suppressed. Accordingly, it is considered that even when being reduction-fired, the valence is less likely to vary and a decrease in a specific resistance can be suppressed, and thus a high specific resistance can be exhibited in a wide temperature range. In addition, from the same reason, it is considered that a low dielectric loss can be exhibited.

In addition, the dielectric composition according to the present invention substantially does not contain an alkali metal, it is possible to prevent a composition deviation of the dielectric composition and contamination of a furnace due to evaporation of the alkali metal.

Furthermore, although the use of lead is regulated by restriction of hazardous substances directive (RoHS), and the like, the dielectric composition according to the present invention substantially does not contain lead.

In addition, an electric component according to the present invention includes the above-described dielectric composition.

DETAILED DESCRIPTION OF THE PREFERRED EMBODIMENTS

First Embodiment

<Multilayer Ceramic Capacitor>

Figure 1:
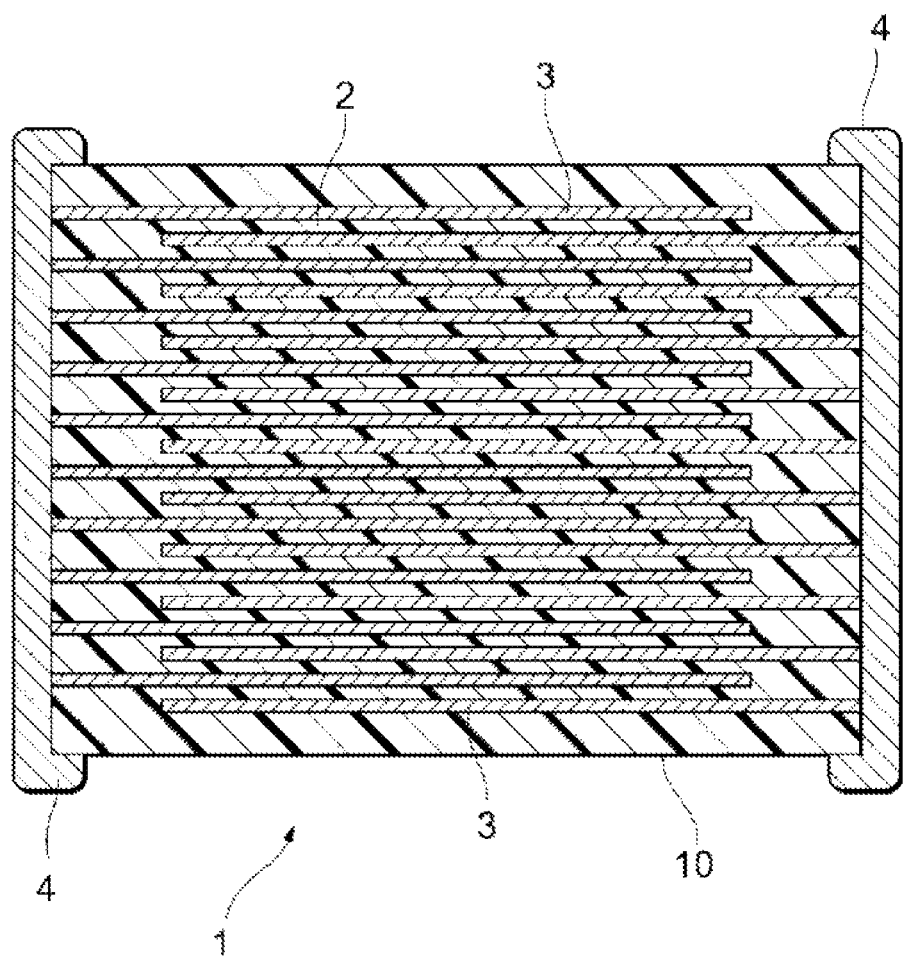
FIG. 1 is a schematic cross-sectional view of a multilayer ceramic capacitor according to an embodiment of the present invention.

A multilayer ceramic capacitor 1 as an example of an electronic component according to an embodiment is illustrated in FIG. 1. The multilayer ceramic capacitor 1 includes an element main body 10 in which a dielectric layer 2 and an inner electrode layer 3 are alternately stacked. A pair of outer electrodes 4 electrically connected to a plurality of the inner electrode layers 3 arranged alternately at the inside of the element main body 10 are formed at both ends of the element main body 10. Although a shape of the element main body 10 is not particularly limited, the shape is typically set to a rectangular parallelepiped shape. In addition, dimensions of the element main body 10 are not particularly limited, and may be set to appropriate dimensions in correspondence with applications.

<Dielectric Layer>

The dielectric layer 2 is formed from a dielectric composition according to this embodiment to be described later.

The thickness (interlayer thickness) of the dielectric layer 2 per one layer is not particularly limited, and can be set in correspondence with desired characteristics, applications, or the like. Typically, the interlayer thickness is preferably 30 μm or less, more preferably 15 μm or less, and still more preferably 10 μm or less.

<Inner Electrode Layer>

In this embodiment, the inner electrode layer 3 is staked so that respective ends are alternately exposed to two opposite end surfaces of the element main body 10.

A conductive material contained in the inner electrode layer 3 is not particularly limited. Examples of a metal that is used as the conductive material include palladium, platinum, a silver-palladium alloy, nickel, a nickel-based alloy, copper, a copper-based alloy, and the like. Note that, various minor components such as phosphor and/or sulfur may be contained in nickel, the nickel-based alloy, copper, or the copper-based alloy in an amount of approximately 0.1% by mass or less. In addition, the inner electrode layer 3 can be formed by using commercially available paste for electrodes. The thickness of the inner electrode layer 3 may be appropriately determined in correspondence with applications or the like.

<Outer Electrode>

A conductive material contained in each of the outer electrodes 4 is not particularly limited. For example, known conductive materials such as nickel, copper, tin, silver, palladium, platinum, gold, alloys thereof, or a conductive resin may be used. The thickness of the outer electrode 4 may be appropriately determined in correspondence with applications or the like.

<Dielectric Composition>

The dielectric composition that constitutes the dielectric layer 2 according to this embodiment contains at least one of barium and strontium, and tantalum as a main component.

The main component of the dielectric composition according to this embodiment preferably includes strontium, and more preferably both strontium and barium.

The main component of the dielectric composition according to this embodiment is expressed by $\{Ba_xSr_{(1-x)}\}_mTa_4O_{12}$.

x is preferably 0.75 or less, more preferably less than 0.75, and still more preferably 0.1 to 0.50.

m preferably satisfies a relationship of 1.95≤m≤2.40, and more preferably 2.10≤m≤2.40.

Although a crystal system of a crystal of the main component in the dielectric composition according to this embodiment is not particularly limited, the crystal is preferably a tetragonal system or an orthogonal system, and more preferably the tetragonal system.

Note that, in this embodiment, when the amount of elements contained in the dielectric composition other than oxygen is set to 100 parts by mole, the elements constituting the main component other than oxygen occupy 50 to 99.5 parts by mole.

In addition, the dielectric composition according to this embodiment substantially does not contain niobium, an alkali metal, and lead. Description of "substantially does not contain niobium, an alkali metal, and lead" represents that when the amount of elements contained in the dielectric composition other than oxygen is set to 100 parts by mole, the sum of "niobium, an alkali metal, and lead" is 10 parts by mole or less, and preferably 5 parts by mole or less.

The dielectric composition according to this embodiment contains silicon and manganese as a first subcomponent.

When the amount of the main component contained in the dielectric composition is set to 100 parts by mole, the amount of silicon contained in the dielectric composition is 5.0 to 20.0 parts by mole in terms of $SiO_2$, and preferably 10.0 to 17.5 parts by mole. That is, the amount of silicon contained is obtained in terms of an oxide when the valence of silicon is tetravalent.

When the amount of the main component contained in the dielectric composition is set to 100 parts by mole, the amount of manganese contained in the dielectric composition is 1.0 to 4.5 parts by mole in terms of MnO, and preferably 2.0 to 4.5 parts by mole. That is, the amount of manganese contained is obtained in terms of an oxide when the valence of manganese is divalent.

The dielectric composition according to this embodiment preferably contain at least one selected from the group consisting of vanadium, magnesium, zirconium, and tungsten as a second subcomponent.

Specifically, when the amount of the main component contained in the dielectric composition is set to 100 parts by mole, it is preferable that at least one selected from the group consisting of vanadium, magnesium, zirconium, and tungsten is contained in the dielectric composition in an amount of 0.25 to 10 parts by mole in terms of a predetermined oxide.

The amount of vanadium contained is an amount in terms of $V_2O_5$. That is, the amount of vanadium contained is obtained in terms of an oxide when the valence of vanadium is pentavalent.

The amount of magnesium contained is an amount in terms of MgO. That is, the amount of magnesium contained is obtained in terms of an oxide when the valence of magnesium is divalent.

The amount of zirconium contained is an amount in terms of $ZrO_2$. That is, the amount of zirconium contained is obtained in terms of an oxide when the valence of zirconium is tetravalent.

The amount of tungsten contained is an amount in terms of $WO_3$. That is, the amount of tungsten contained is obtained in terms of an oxide when the valence of tungsten is hexavalent.

The dielectric composition according to this embodiment may contain aluminum, calcium, chromium, a rare-earth element, and the like in addition to the main component, the first subcomponent, and the second subcomponent.

<Method of Manufacturing Multilayer Ceramic Capacitor>

Next, description will be given of an example of a method of manufacturing the multilayer ceramic capacitor 1 illustrated in FIG. 1.

In this embodiment, a powder of the main component that constitutes the dielectric composition, and powders of the first subcomponent and the second subcomponent are prepared, respectively. Although a method preparing the powder of the main component is not particularly limited, the powder can be prepared by a solid phase reaction method such as calcination. Raw materials of respective elements which constitute the powder of the main component, and the powders of the first subcomponent and the second subcomponent are not particularly limited, and oxides of the respective elements can be used. In addition, various kinds of compounds from which oxides of the respective elements can be obtained by firing can be used.

Raw materials of the powder of the main component, and the powders of the first subcomponent and the second subcomponent are weighed in a predetermined ratio, and wet mixing is performed for predetermined time by using a ball mill, or the like. The resultant mixed powder is dried and subjected to a heat treatment in a range of 700° C. to 1300° C. in the air to obtain a calcined powder of the main component, the first subcomponent, and the second subcomponent. In addition, the calcined powder may be pulverized for predetermined time by using a ball mill, or the like.

Next, paste for manufacturing a green chip is prepared. The obtained calcined powder and a solvent are kneaded to form a paint, thereby preparing paste for the dielectric layer. Known binder and the solvent may be used.

The paste for the dielectric layer may contain an additive such as a plasticizer and a dispersant as necessary.

A paste for the inner electrode layer is obtained by kneading a raw material of the above-described conductive material, a binder, and a solvent. Known binder and solvent may be used. The paste for the inner electrode layer may contain an additive such as an inhibitor and a plasticizer as necessary.

A paste for the outer electrode can be prepared in the same manner as in the paste for the inner electrode layer.

A green sheet and an inner electrode pattern are formed by using the obtained pastes, and the green sheet and the inner electrode pattern are stacked to obtain a green chip.

The obtained green chip is subjected to a binder removal treatment as necessary. As binder removal treatment conditions, for example, a holding temperature is preferably set to 200° C. to 350° C.

After the binder removal treatment, the green chip is fired to obtain the element main body 10. In this embodiment, a firing atmosphere is not particularly limited, and firing may be performed in the air or a reducing atmosphere. In this embodiment, the holding temperature at the time of firing is, for example, 1200° C. to 1355° C.

After the firing, the obtained element main body 10 is subjected to a reoxidation treatment (annealing) as necessary. As annealing conditions, for example, an oxygen partial pressure at the time of annealing is preferably set to an oxygen partial pressure higher than an oxygen partial pressure at the timing of firing, and a holding temperature is preferably set to 1150° C. or lower.

A dielectric composition that constitutes the dielectric layer 2 of the element main body 10 obtained as described above is the above-described dielectric composition. The element main body 10 is subjected to end surface polishing, the paste for the outer electrode is applied and is preliminarily fired to form the outer electrode 4. Then, a coating layer is formed on a surface of the outer electrode 4 by plating or the like as necessary.

As described above, the multilayer ceramic capacitor 1 according to this embodiment is manufactured.

The dielectric composition according to this embodiment contains $\{Ba_xSr_{(1-x)}\}_mTa_4O_{12}$ as the main component, m is within a predetermined range, and the dielectric composition contains a predetermined amount of silicon and manganese as the first subcomponent. According to this, it is possible to obtain a dielectric composition having a high sintering density and a high specific dielectric constant even when the dielectric composition is sintered by firing the dielectric composition at a relatively low temperature (for example, 1200° C. to 1355° C.).

The reason for this is not necessarily certain, but the following reason is considered. When m is within the above-described range, and a predetermined amount of silicon and manganese is contained in the dielectric composition, it is considered that an operation of lowering a sintering initiation temperature is obtained. According to this, it is considered that even when being fired at a relatively low temperature, the high sintering density is easily obtained, and the specific dielectric constant is also improved.

In addition, according to this embodiment, it is possible to obtain a dielectric composition that substantially does not contain niobium, an alkali metal, and lead, and exhibits a high density, a high specific dielectric constant, a low dielectric loss, and a high specific resistance.

The dielectric composition that contains tantalum and substantially does not contain niobium according to this embodiment tends to exhibit a higher specific dielectric constant, a lower dielectric loss, and a higher specific resistance in comparison to a dielectric composition that does not contain tantalum and includes niobium in the related art. As the reason for this, the following reason is considered. Specifically, in tantalum oxide ($Ta_2O_5$), an oxygen defect is less likely to occur in comparison to niobium oxide ($Nb_2O_5$).

Dielectric characteristics are characteristics on the premise of an insulator. Accordingly, the dielectric composition is required to have a high resistance so that the dielectric composition does not become a semiconductor or a conductor. In addition, as described above, in the tantalum oxide ($Ta_2O_5$), the oxygen defect is less likely to occur in comparison to the niobium oxide ($Nb_2O_5$). In other words, valence change is controlled. Accordingly, it is considered that a decrease in specific resistance can be suppressed, and thus a high specific resistance can be exhibited in a high temperature range. In addition, from the same reason, it is considered that a low dielectric loss can be exhibited.

Second Embodiment

<Thin Film Capacitor>

Figure 2:
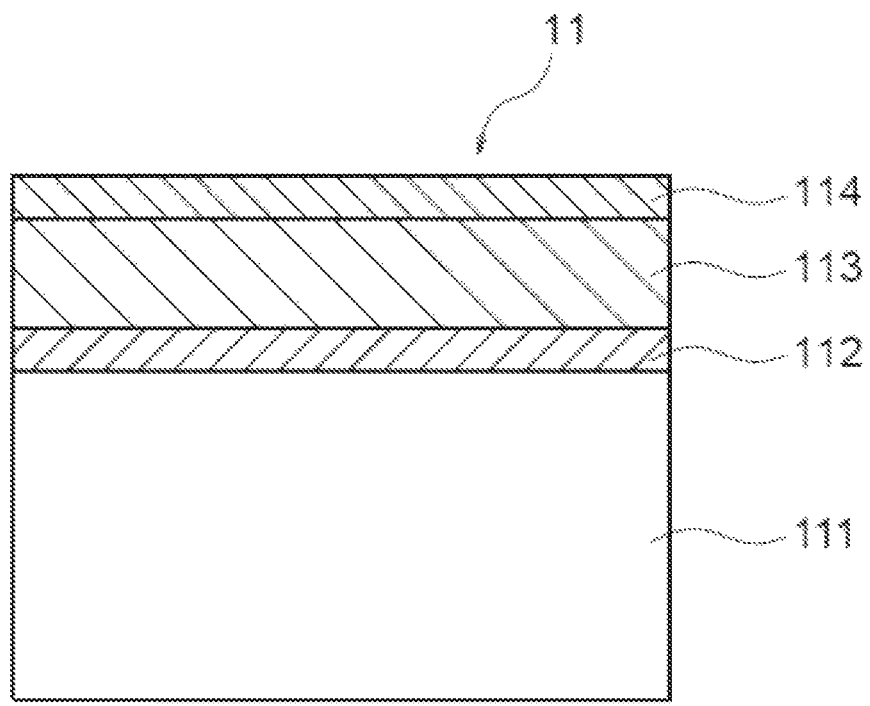
FIG. 2 is a schematic cross-sectional view of a thin film capacitor according to an embodiment of the present invention.

A schematic view of a thin film capacitor 11 according to this embodiment is shown in FIG. 2. In the thin film capacitor 11 illustrated in FIG. 2, a lower electrode 112 and a dielectric thin film 113 are formed on a substrate 111 in this order, and an upper electrode 114 is provided on a surface of the dielectric thin film 113.

Although a material of the substrate 111 is not particularly limited, when using a silicon single crystal substrate is used as the substrate 111, availability and cost are excellent. When flexibility is emphasized, nickel foil or copper foil can also be used as the substrate.

A material of the lower electrode 112 and the upper electrode 114 is not particularly limited, and the material may function as an electrode. Examples of the material include platinum, silver, nickel, and the like. The thickness of the lower electrode 112 is not particularly limited, and the thickness is, for example, 0.01 to 10 μm. The thickness of the upper electrode 114 is not particularly limited, and the thickness is, for example, 0.01 to 10 μm.

A composition of a dielectric composition that constitutes the dielectric thin film 113 and a crystal system of a main component according to this embodiment are similar as in the first embodiment.

Although the thickness of the dielectric thin film 113 is not particularly limited, but the thickness is preferably 10 nm to 1 μm.

<Method of Manufacturing Thin Film Capacitor>

Next, a method of manufacturing the thin film capacitor 11 will be described.

There is no particular limitation to a film formation method of a thin film that finally becomes the dielectric thin film 113. Examples of the method include a vacuum deposition method, a sputtering method, a pulsed laser deposition method (PLD method), a metalorganic chemical vapor deposition method (MO-CVD method), a metalorganic decomposition method (MOD method), a sol-gel method, a chemical solution deposition method (CSD method), and the like.

In addition, a minute impurity or subcomponent may be contained in a raw material that is used in film formation, but there is no particular problem as long as the impurity or the subcomponent is contained in an amount that does not greatly damage the performance of the thin film. In addition, the dielectric thin film 113 according to this embodiment may contain minute impurities or subcomponents in an amount that does not greatly damage the performance.

In this embodiment, a film formation method by the PLD method will be described.

First, a silicon single crystal substrate is prepared as the substrate 111. Next, films of $SiO_2$, $TiO_x$, and platinum are sequentially formed on the silicon single crystal substrate, and the lower electrode 112 formed from platinum is formed. A method of forming the lower electrode 112 is not particularly limited. Examples of the method include a sputtering method, a CVD method, and the like.

Next, the dielectric thin film 113 is formed on the lower electrode 112 by the PLD method. In addition, a region where a thin film is not partially formed may be formed by using a metal mask so as to expose a part of the lower electrode 112.

In the PLD method, first, a target containing a constituent element of the dielectric thin film 113 that is desired is provided in a film formation chamber. Next, a surface of the target is irradiated with a pulsed laser. The surface of the target instantly vaporizes due to strong energy of the pulsed laser. Then, an evaporated material is deposited on the substrate disposed to face the target to form the dielectric thin film 113.

The type of the target is not particularly limited, and in addition to a metal oxide sintered body containing the constituent element of the dielectric thin film 113 to be manufactured, an alloy or the like can be used. In addition, it is preferable that respective elements are evenly distributed in the target, but a variation may exist in the distribution within a range having no influence on the quality of the dielectric thin film 113 to be obtained.

It is not necessary for the target to be one piece, and a plurality of targets containing parts of the constituent elements of the dielectric thin film 113 may be prepared to be used in film formation. A shape of the target is not limited, and the shape may be set to a shape suitable for a film formation device that is used.

In addition, in the PLD method, it is preferable to heat the substrate 111 with an infrared laser at the timing of film formation so as to crystallize the dielectric thin film 113 that is formed. A heating temperature of the substrate 111 varies in accordance with constituent elements, and the composition, and the like of the dielectric thin film 113 and the substrate 111, but the film formation is performed by heating the substrate 111 to be, for example, 600° C. to 800° C. When the temperature of the substrate 111 is set to an appropriate temperature, the dielectric thin film 113 is likely to be crystallized and occurrence of cracks during cooling can be prevented.

Finally, the upper electrode 114 is formed on the dielectric thin film 113, thereby manufacturing the thin film capacitor 11. Note that, a material of the upper electrode 114 is not particularly limited, and silver, gold, copper, or the like can be used. In addition, there is no particular limitation to a method of forming the upper electrode 114. For example, the upper electrode 114 can be formed by deposition, or a sputtering method.

Third Embodiment

Hereinafter, a third embodiment will be described, but a configuration that is not specifically described is similar as in the first embodiment.

In this embodiment, when the amount of the main component contained in a dielectric composition is set to 100 parts by mole, the amount of manganese contained in the dielectric composition is 5.0 to 40.0 parts by mole in terms of MnO, and preferably 7.5 to 30.0 parts by mole.

The dielectric composition according to this embodiment preferably contains at least one selected from the group consisting of vanadium, magnesium, zirconium, tungsten, and a rare-earth element as the second subcomponent.

Specifically, when the amount of the main component contained in the dielectric composition is set to 100 parts by mole, at least one selected from the group consisting of vanadium, magnesium, zirconium, tungsten, and a rare-earth element is preferably contained in the dielectric composition in an amount of 0.25 to 10.0 parts by mole in terms of a predetermined oxide.

The rare-earth element is expressed by "RE". The amount of the rare-earth element (RE) contained is an amount in terms of $RE_2O_3$. That is, the amount of the rare-earth element contained is obtained in terms of an oxide when the valence of the rare-earth element is trivalent.

Examples of the rare-earth element include Sc, Y, La, Ce, Pr, Nd, Pm, Sm, Eu, Gd, Tb, Dy, Ho, Er, Tm, Yb, and Lu, and one kind or two or more kinds may be used in combination.

The dielectric composition according to this embodiment may contain aluminum, calcium, chromium, titanium, hafnium, molybdenum, or the like in addition to the main component, the first subcomponent, and the second subcomponent.

In this embodiment, for example, a holding temperature at the time of firing is 1150° C. to 1250° C.

The dielectric composition according to this embodiment contains $\{Ba_xSr_{(1-x)}\}_mTa_4O_{12}$ as the main component, m is within a predetermined range, and the dielectric composition contains a predetermined amount of silicon and manganese as the first subcomponent. According to this, it is possible to obtain a dielectric composition having a high sintering density and a high specific dielectric constant even when the dielectric composition is sintered by firing the dielectric composition at a relatively low temperature (for example, 1150° C. to 1250° C.).

The reason for this is not necessarily certain, but the following reason is considered. When m is within the above-described range, and a predetermined amount of silicon and manganese is contained in the dielectric composition, it is considered that an operation of lowering a sintering initiation temperature is obtained. According to this, it is considered that even when being fired at a relatively low temperature, the high sintering density is easily obtained, and the specific dielectric constant is also improved.

Hereinbefore, the embodiments of the present invention have been described, but the present invention is not limited to the embodiments, and it should be understood that the present invention can be executed in various different aspects within a range not departing from the gist of the present invention.

In the above-described embodiments, description has been given of a case where the electronic component according to the present invention is a multilayer ceramic capacitor, but the electronic component according to the present invention is not limited to the multilayer ceramic capacitor, and may be any electronic component including the above-described dielectric composition.

For example, the above-described electronic component may be a single plate type ceramic capacitor in which a pair of electrodes is formed on a single-layer dielectric substrates formed from the dielectric composition.

In addition, the electronic component according to the present invention may be a filter, a diplexer, a resonator, an oscillator, an antenna, or the like in addition to the capacitor.

EXAMPLES

Hereinafter, the present invention will be described in more detail with reference to examples and comparative examples. However, the present invention is not limited to the following examples.

Powders of barium carbonate ($BaCO_3$), strontium carbonate ($SrCO_3$), and tantalum oxide ($Ta_2O_5$) were prepared as starting raw materials of the main component of the dielectric composition. The prepared starting raw materials of were weighed so that x in the composition of the main component expressed by $\{Ba_xSr_{(1-x)}\}_mTa_4O_{12}$ becomes 0.5 in Table 1, Table 2, Table 4, and Table 5 and becomes as described in Table 3 and Table 6, and m becomes as described in Table 1 to Table 6.

In addition, as starting raw materials of the first subcomponent and the second subcomponent in the dielectric composition, respective raw material powders were prepared, and the starting raw materials of the first subcomponent and the second subcomponent which were prepared were weighted so that the amounts of the first subcomponent contained and the second subcomponent contained after firing becomes as described in Table 1 to Table 6. Note that, "the amounts of the first subcomponent contained and the second subcomponent contained" represents "the amounts of the first subcomponent and the second subcomponent contained in the dielectric composition in terms of a predetermined oxide when the amount of the main component contained in the dielectric composition is set to 100 parts by mole".

Next, the respective weighed powders were wet-mixed with a ball mill by using an ion exchanged water as a dispersion medium, and the resultant mixture was dried to obtain a mixed raw material powder. Then, the obtained mixed raw material powder was subject to a heat treatment in the air under conditions of a holding temperature of 900° C. and holding time of two hours to obtain a calcined powder.

The obtained calcined powder was wet-pulverized with a ball mill by using an ion exchanged water as a dispersion medium and was dried to obtain a dielectric raw material.

10 parts by mass of aqueous solution containing 6 parts by mass of polyvinyl alcohol resin as a binder was added to 100 parts by mass of dielectric raw material obtained, and the resultant mixture was granulated to obtain a granulated powder.

The obtained granulated powder was put into a mold having a diameter ϕ of 12 mm, was subjected to temporary press-molding at a pressure of 0.6 ton/cm$^2$, and was subjected to main press-molding at a pressure of 1.2 ton/cm$^2$ to obtain a disc-shaped green molded body.

Next, the obtained green molded body was subjected to a binder removal treatment, firing, and annealing under the following conditions to obtain an element main body.

Binder removal treatment conditions were set as follows. That is, a holding temperature was set to 400° C., temperature holding time was set to two hours, and an atmosphere was set to the air.

In respective samples shown in Table 1 to Table 3, the holding temperature during firing was set to 1350° C. In addition, in respective samples shown in Table 4 to Table 6, the holding temperature during firing was set to 1250° C. As other firing conditions, temperature holding time was set to two hours, and an atmosphere was set to humidified $N_2+H_2$ mixed gas (an oxygen partial pressure: $10^{-12}$ MPa). Note that, a water was used to humidify the atmospheric gas during firing.

As annealing conditions, a holding temperature was set to 1050° C., temperature holding time was set to two hours, and an atmospheric gas was set to a humidified $N_2$ gas (an oxygen partial pressure: $10^{-7}$ MPa). Note that, a water was used to humidify the atmospheric gas during annealing.

A sintering density, a specific dielectric constant, and a specific resistance of the obtained sintered body (dielectric composition) were investigated by the following method. Note that, in order to measure the specific dielectric constant and the specific resistance, an In—Ga electrode is applied to the dielectric composition (sintered body), thereby obtaining a disc-shaped ceramic capacitor sample (capacitor sample).

<Sintering Density>

The sintering density of the dielectric composition was measured as follows. First, a volume V of the dielectric composition was calculated. Next, a mass M of the disc-shaped dielectric composition was measured, and M/V was calculated to obtain the sintering density of the dielectric composition. Results are shown in Table 1 to Table 6.

<Specific Dielectric Constant>

A signal having a frequency of 1 kHz and an input signal level (measurement voltage) of 1 V/rms was input to the capacitor sample at room temperature (20° C.) by using a digital LCR meter (4284A, manufactured by YHP) to obtain electrostatic capacitance C. Then, the specific dielectric constant was calculated on the basis of the thickness of the dielectric composition, an effective electrode area, and the electrostatic capacitance C obtained as a result of measurement. Results are shown in Table 1 to Table 6.

<Specific Resistance>

An insulation resistance of the capacitor sample was measured at a reference temperature (25° C.) by using a digital resistance meter (R8340, manufactured by ADVANTEST CORPORATION). The specific resistance was calculated from the obtained insulation resistance, the effective electrode area, and the thickness of the dielectric composition. Results are shown in Table 1 to Table 6.

TABLE 1

| Sample No. | m | Amount of first subcomponent contained | | Amount of second subcomponent contained | | | | Sintering density (g/cm$^3$) | Specific dielectric constant (—) | Specific resistance (Ω · m) |
|---|---|---|---|---|---|---|---|---|---|---|
| | | Si In terms of SiO$_2$ (mol) | Mn In terms of MnO (mol) | V In terms of V$_2$O$_5$ (mol) | Mg In terms of MgO (mol) | Zr In terms of ZrO$_2$ (mol) | W In terms of WO$_3$ (mol) | | | |
| 1 | 1.90 | 2.50 | 0.00 | 0.00 | 0.00 | 0.00 | 0.00 | 4.16 | 54 | 1.4E+10 |
| 2 | 1.90 | 2.50 | 0.50 | 0.00 | 0.00 | 0.00 | 0.00 | 5.28 | 58 | 3.7E+10 |
| 3 | 1.90 | 7.50 | 1.50 | 0.00 | 0.00 | 0.00 | 0.00 | 5.58 | 65 | 5.5E+10 |
| 4 | 1.90 | 20.00 | 4.50 | 0.00 | 0.00 | 0.00 | 0.00 | 5.98 | 68 | 7.1E+10 |
| 5 | 1.95 | 7.50 | 1.50 | 0.00 | 0.00 | 0.00 | 0.00 | 6.55 | 77 | 2.2E+11 |
| 6 | 2.00 | 7.50 | 1.50 | 0.00 | 0.00 | 0.00 | 0.00 | 6.62 | 82 | 4.6E+11 |
| 7 | 2.05 | 7.50 | 1.50 | 0.00 | 0.00 | 0.00 | 0.00 | 6.89 | 89 | 4.9E+11 |
| 8 | 2.10 | 7.50 | 1.50 | 0.00 | 0.00 | 0.00 | 0.00 | 7.05 | 105 | 5.9E+11 |
| 9 | 2.20 | 7.50 | 1.50 | 0.00 | 0.00 | 0.00 | 0.00 | 7.12 | 110 | 6.5E+11 |
| 10 | 2.30 | 7.50 | 1.50 | 0.00 | 0.00 | 0.00 | 0.00 | 7.17 | 105 | 5.0E+11 |
| 11 | 2.40 | 7.50 | 1.50 | 0.00 | 0.00 | 0.00 | 0.00 | 7.01 | 102 | 3.3E+11 |
| 12 | 2.45 | 7.50 | 1.50 | 0.00 | 0.00 | 0.00 | 0.00 | 6.12 | 61 | 9.5E+10 |
| 13 | 2.50 | 17.50 | 4.50 | 0.00 | 0.00 | 0.00 | 0.00 | 6.35 | 65 | 1.2E+11 |
| 14 | 2.05 | 0.00 | 0.00 | 0.00 | 0.00 | 0.00 | 0.00 | 3.65 | 38 | 2.0E+09 |
| 15 | 2.05 | 2.50 | 1.00 | 0.00 | 0.00 | 0.00 | 0.00 | 4.45 | 59 | 4.2E+10 |
| 16 | 2.05 | 5.00 | 1.00 | 0.00 | 0.00 | 0.00 | 0.00 | 6.61 | 75 | 3.3E+11 |
| 17 | 2.05 | 10.00 | 1.00 | 0.00 | 0.00 | 0.00 | 0.00 | 6.72 | 85 | 4.3E+11 |
| 18 | 2.05 | 12.50 | 1.00 | 0.00 | 0.00 | 0.00 | 0.00 | 6.76 | 88 | 5.5E+11 |
| 19 | 2.05 | 15.00 | 1.00 | 0.00 | 0.00 | 0.00 | 0.00 | 6.79 | 90 | 5.4E+11 |
| 20 | 2.05 | 17.50 | 1.00 | 0.00 | 0.00 | 0.00 | 0.00 | 6.69 | 84 | 4.9E+11 |
| 21 | 2.05 | 20.00 | 1.00 | 0.00 | 0.00 | 0.00 | 0.00 | 6.61 | 76 | 4.5E+11 |

TABLE 1-continued

| Sample No. | m | Amount of first subcomponent contained | | Amount of second subcomponent contained | | | | Sintering density ($g/cm^3$) | Specific dielectric constant (—) | Specific resistance ($\Omega \cdot m$) |
|---|---|---|---|---|---|---|---|---|---|---|
| | | Si In terms of $SiO_2$ (mol) | Mn In terms of MnO (mol) | V In terms of $V_2O_5$ (mol) | Mg In terms of MgO (mol) | Zr In terms of $ZrO_2$ (mol) | W In terms of $WO_3$ (mol) | | | |
| 22 | 2.05 | 25.00 | 1.00 | 0.00 | 0.00 | 0.00 | 0.00 | 6.58 | 66 | 3.3E+11 |
| 23 | 2.05 | 7.50 | 0.00 | 0.00 | 0.00 | 0.00 | 0.00 | 4.32 | 53 | 2.6E+10 |
| 24 | 2.05 | 7.50 | 0.50 | 0.00 | 0.00 | 0.00 | 0.00 | 6.22 | 64 | 9.1E+10 |
| 25 | 2.05 | 7.50 | 1.00 | 0.00 | 0.00 | 0.00 | 0.00 | 6.59 | 72 | 2.2E+11 |
| 26 | 2.05 | 7.50 | 2.00 | 0.00 | 0.00 | 0.00 | 0.00 | 6.63 | 81 | 4.4E+11 |
| 27 | 2.05 | 7.50 | 2.50 | 0.00 | 0.00 | 0.00 | 0.00 | 6.70 | 85 | 5.2E+11 |
| 28 | 2.05 | 7.50 | 3.00 | 0.00 | 0.00 | 0.00 | 0.00 | 6.77 | 88 | 6.2E+11 |
| 29 | 2.05 | 7.50 | 4.00 | 0.00 | 0.00 | 0.00 | 0.00 | 6.70 | 82 | 4.1E+11 |
| 30 | 2.05 | 7.50 | 4.50 | 0.00 | 0.00 | 0.00 | 0.00 | 6.61 | 80 | 2.8E+11 |
| 31 | 2.05 | 7.50 | 5.00 | 0.00 | 0.00 | 0.00 | 0.00 | 6.34 | 58 | 8.9E+10 |

TABLE 2

| Sample No. | m | Amount of first subcomponent contained | | Amount of second subcomponent contained | | | | Sintering density ($g/cm^3$) | Specific dielectric constant (—) | Specific resistance ($\Omega \cdot m$) |
|---|---|---|---|---|---|---|---|---|---|---|
| | | Si In terms of $SiO_2$ (mol) | Mn In terms of MnO (mol) | V In terms of $V_2O_5$ (mol) | Mg In terms of MgO (mol) | Zr In terms of $ZrO_2$ (mol) | W In terms of $WO_3$ (mol) | | | |
| 32 | 1.95 | 5.00 | 1.00 | 0.00 | 0.00 | 0.00 | 0.00 | 6.52 | 72 | 1.2E+11 |
| 33 | 2.00 | 15.00 | 2.50 | 0.00 | 0.00 | 0.00 | 0.00 | 6.77 | 86 | 4.5E+11 |
| 34 | 2.05 | 10.00 | 4.50 | 0.00 | 0.00 | 0.00 | 0.00 | 6.79 | 88 | 4.9E+11 |
| 35 | 2.10 | 17.50 | 1.00 | 0.00 | 0.00 | 0.00 | 0.00 | 7.18 | 113 | 6.6E+11 |
| 36 | 2.20 | 12.50 | 3.00 | 0.00 | 0.00 | 0.00 | 0.00 | 7.21 | 121 | 7.8E+11 |
| 37 | 2.30 | 5.00 | 1.00 | 0.00 | 0.00 | 0.00 | 0.00 | 7.04 | 107 | 5.6E+11 |
| 38 | 2.40 | 20.00 | 4.50 | 0.00 | 0.00 | 0.00 | 0.00 | 7.09 | 112 | 6.5E+11 |
| 39 | 2.20 | 12.50 | 3.00 | 0.50 | 0.25 | 0.00 | 0.00 | 7.23 | 123 | 1.5E+12 |
| 40 | 2.20 | 12.50 | 3.00 | 0.50 | 0.00 | 1.00 | 0.00 | 7.24 | 125 | 1.8E+12 |
| 41 | 2.20 | 12.50 | 3.00 | 1.00 | 0.00 | 0.00 | 0.50 | 7.26 | 122 | 1.8E+12 |
| 42 | 2.20 | 12.50 | 3.00 | 0.25 | 0.50 | 0.50 | 0.00 | 7.28 | 126 | 2.2E+12 |
| 43 | 2.20 | 12.50 | 3.00 | 0.00 | 0.00 | 0.50 | 0.50 | 7.30 | 123 | 1.5E+12 |
| 44 | 2.20 | 12.50 | 3.00 | 1.00 | 0.50 | 0.00 | 0.50 | 7.26 | 121 | 2.2E+12 |
| 45 | 2.20 | 12.50 | 3.00 | 0.50 | 0.00 | 0.50 | 0.50 | 7.32 | 128 | 3.5E+12 |
| 46 | 2.20 | 12.50 | 3.00 | 1.00 | 1.00 | 1.00 | 1.00 | 7.22 | 126 | 3.1E+12 |
| 47 | 2.20 | 12.50 | 3.00 | 0.25 | 0.25 | 0.25 | 0.25 | 7.28 | 121 | 2.9E+12 |

TABLE 3

| Sample No. | m | $\{Ba_xSr_{(1-x)}\}_mTa_4O_{12}$ x | Amount of first subcomponent contained | | Amount of second subcomponent contained | | | | Sintering density ($g/cm^3$) | Specific dielectric constant (—) | Specific resistance ($\Omega \cdot m$) |
|---|---|---|---|---|---|---|---|---|---|---|---|
| | | | Si In terms of $SiO_2$ (mol) | Mn In terms of MnO (mol) | V In terms of $V_2O_5$ (mol) | Mg In terms of MgO (mol) | Zr In terms of $ZrO_2$ (mol) | W In terms of $WO_3$ (mol) | | | |
| 48 | 2.20 | 0.75 | 7.50 | 1.50 | 0.00 | 0.00 | 0.00 | 0.00 | 7.15 | 102 | 5.5E+11 |
| 9  | 2.20 | 0.50 | 7.50 | 1.50 | 0.00 | 0.00 | 0.00 | 0.00 | 7.12 | 110 | 6.5E+11 |
| 49 | 2.20 | 0.25 | 7.50 | 1.50 | 0.00 | 0.00 | 0.00 | 0.00 | 7.21 | 112 | 6.9E+11 |
| 50 | 2.20 | 0.10 | 7.50 | 1.50 | 0.00 | 0.00 | 0.00 | 0.00 | 7.16 | 113 | 6.3E+11 |
| 51 | 2.20 | 0.00 | 7.50 | 1.50 | 0.00 | 0.00 | 0.00 | 0.00 | 7.11 | 108 | 6.1E+11 |

TABLE 4

| Sample No. | m | Amount of first subcomponent contained | | Amount of second subcomponent contained | | | | | Sintering density (g/cm³) | Specific dielectric constant (—) | Specific resistance (Ω · m) |
|---|---|---|---|---|---|---|---|---|---|---|---|
| | | Si In terms of SiO2 (mol) | Mn In terms of MnO (mol) | V In terms of V₂O₅ (mol) | Mg In terms of MgO (mol) | Zr In terms of ZrO₂ (mol) | W In terms of WO₃ (mol) | RE In terms of RE₂O₃ (mol) | | | |
| 1 1 | 1.90 | 2.50 | 0.00 | 0.00 | 0.00 | 0.00 | 0.00 | 0.00 | 3.65 | 34 | 2.4E+07 |
| 1 2 | 1.90 | 2.50 | 4.50 | 0.00 | 0.00 | 0.00 | 0.00 | 0.00 | 5.34 | 54 | 7.7E+09 |
| 1 3 | 1.90 | 5.00 | 6.00 | 0.00 | 0.00 | 0.00 | 0.00 | 0.00 | 5.68 | 59 | 3.3E+10 |
| 1 4 | 1.90 | 10.00 | 30.00 | 0.00 | 0.00 | 0.00 | 0.00 | 0.00 | 6.12 | 63 | 4.4E+10 |
| 1 5 | 1.95 | 7.50 | 6.00 | 0.00 | 0.00 | 0.00 | 0.00 | 0.00 | 6.66 | 80 | 4.2E+11 |
| 1 6 | 2.00 | 7.50 | 6.00 | 0.00 | 0.00 | 0.00 | 0.00 | 0.00 | 6.81 | 81 | 3.9E+11 |
| 1 7 | 2.05 | 7.50 | 6.00 | 0.00 | 0.00 | 0.00 | 0.00 | 0.00 | 6.82 | 85 | 4.2E+11 |
| 1 8 | 2.10 | 7.50 | 6.00 | 0.00 | 0.00 | 0.00 | 0.00 | 0.00 | 7.10 | 108 | 6.9E+11 |
| 1 9 | 2.20 | 7.50 | 6.00 | 0.00 | 0.00 | 0.00 | 0.00 | 0.00 | 7.08 | 107 | 7.5E+11 |
| 1 10 | 2.30 | 7.50 | 6.00 | 0.00 | 0.00 | 0.00 | 0.00 | 0.00 | 7.12 | 110 | 5.6E+11 |
| 1 11 | 2.40 | 7.50 | 6.00 | 0.00 | 0.00 | 0.00 | 0.00 | 0.00 | 7.08 | 106 | 5.4E+11 |
| 1 12 | 2.45 | 7.50 | 6.00 | 0.00 | 0.00 | 0.00 | 0.00 | 0.00 | 6.45 | 69 | 1.1E+11 |
| 1 13 | 2.50 | 10.00 | 30.00 | 0.00 | 0.00 | 0.00 | 0.00 | 0.00 | 6.12 | 66 | 9.0E+10 |
| 1 14 | 2.05 | 0.00 | 0.00 | 0.00 | 0.00 | 0.00 | 0.00 | 0.00 | 3.54 | 35 | 5.0E+08 |
| 1 15 | 2.05 | 2.50 | 5.00 | 0.00 | 0.00 | 0.00 | 0.00 | 0.00 | 5.98 | 65 | 7.7E+10 |
| 1 16 | 2.05 | 5.00 | 5.00 | 0.00 | 0.00 | 0.00 | 0.00 | 0.00 | 6.70 | 75 | 3.3E+11 |
| 1 17 | 2.05 | 10.00 | 5.00 | 0.00 | 0.00 | 0.00 | 0.00 | 0.00 | 6.84 | 80 | 6.2E+11 |
| 1 18 | 2.05 | 12.50 | 5.00 | 0.00 | 0.00 | 0.00 | 0.00 | 0.00 | 6.88 | 83 | 6.5E+11 |
| 1 19 | 2.05 | 15.00 | 5.00 | 0.00 | 0.00 | 0.00 | 0.00 | 0.00 | 6.90 | 88 | 7.1E+11 |
| 1 20 | 2.05 | 17.50 | 5.00 | 0.00 | 0.00 | 0.00 | 0.00 | 0.00 | 6.85 | 87 | 6.4E+11 |
| 1 21 | 2.05 | 20.00 | 5.00 | 0.00 | 0.00 | 0.00 | 0.00 | 0.00 | 6.70 | 79 | 4.4E+11 |
| 1 22 | 2.05 | 25.00 | 5.00 | 0.00 | 0.00 | 0.00 | 0.00 | 0.00 | 6.60 | 66 | 3.2E+11 |
| 1 23 | 2.05 | 7.50 | 0.00 | 0.00 | 0.00 | 0.00 | 0.00 | 0.00 | 3.87 | 45 | 4.6E+09 |
| 1 24 | 2.05 | 7.50 | 4.50 | 0.00 | 0.00 | 0.00 | 0.00 | 0.00 | 6.30 | 63 | 6.8E+10 |
| 1 25 | 2.05 | 7.50 | 5.00 | 0.00 | 0.00 | 0.00 | 0.00 | 0.00 | 6.62 | 75 | 2.6E+11 |
| 1 26 | 2.05 | 7.50 | 7.50 | 0.00 | 0.00 | 0.00 | 0.00 | 0.00 | 6.73 | 82 | 6.1E+11 |
| 1 27 | 2.05 | 7.50 | 15.00 | 0.00 | 0.00 | 0.00 | 0.00 | 0.00 | 6.78 | 88 | 6.2E+11 |
| 1 28 | 2.05 | 7.50 | 20.00 | 0.00 | 0.00 | 0.00 | 0.00 | 0.00 | 6.77 | 90 | 7.2E+11 |
| 1 29 | 2.05 | 7.50 | 25.00 | 0.00 | 0.00 | 0.00 | 0.00 | 0.00 | 6.79 | 87 | 7.0E+10 |
| 1 30 | 2.05 | 7.50 | 30.00 | 0.00 | 0.00 | 0.00 | 0.00 | 0.00 | 6.70 | 83 | 5.8E+11 |
| 1 31 | 2.05 | 7.50 | 35.00 | 0.00 | 0.00 | 0.00 | 0.00 | 0.00 | 6.66 | 78 | 3.8E+11 |
| 1 32 | 2.05 | 7.50 | 40.00 | 0.00 | 0.00 | 0.00 | 0.00 | 0.00 | 6.65 | 75 | 3.3E+11 |
| 1 33 | 2.05 | 7.50 | 45.00 | 0.00 | 0.00 | 0.00 | 0.00 | 0.00 | 6.45 | 68 | 7.9E+08 |

TABLE 5

| Sample No. | m | Amount of first subcomponent contained | | Amount of second subcomponent contained | | | | | Sintering density (g/cm³) | Specific dielectric constant (—) | Specific resistance (Ω · m) |
|---|---|---|---|---|---|---|---|---|---|---|---|
| | | Si In terms of SiO₂ (mol) | Mn In terms of MnO (mol) | V In terms of V₂O₅ (mol) | Mg In terms of MgO (mol) | Zr In terms of ZrO₂ (mol) | W In terms of WO₃ (mol) | RE In terms of RE₂O₃ (mol) | | | |
| 1 34 | 1.95 | 5.00 | 5.00 | 0.00 | 0.00 | 0.00 | 0.00 | 0.00 | 6.55 | 74 | 2.2E+11 |
| 1 35 | 2.00 | 10.00 | 10.00 | 0.00 | 0.00 | 0.00 | 0.00 | 0.00 | 6.92 | 93 | 8.5E+11 |
| 1 36 | 2.05 | 10.00 | 25.00 | 0.00 | 0.00 | 0.00 | 0.00 | 0.00 | 6.95 | 94 | 8.9E+11 |
| 1 37 | 2.10 | 12.50 | 20.00 | 0.00 | 0.00 | 0.00 | 0.00 | 0.00 | 7.25 | 123 | 9.6E+11 |
| 1 38 | 2.20 | 10.00 | 20.00 | 0.00 | 0.00 | 0.00 | 0.00 | 0.00 | 7.24 | 121 | 9.8E+11 |
| 1 39 | 2.30 | 5.00 | 5.00 | 0.00 | 0.00 | 0.00 | 0.00 | 0.00 | 7.04 | 112 | 5.6E+11 |
| 1 40 | 2.40 | 20.00 | 5.00 | 0.00 | 0.00 | 0.00 | 0.00 | 0.00 | 7.09 | 102 | 6.5E+11 |
| 1 41 | 2.10 | 10.00 | 15.00 | 0.50 | 0.25 | 0.00 | 0.00 | 1.00 (Ho) | 7.30 | 123 | 1.5E+12 |
| 1 42 | 2.10 | 10.00 | 15.00 | 0.50 | 1.00 | 1.00 | 2.50 | 0.00 | 7.26 | 121 | 2.2E+12 |
| 1 43 | 2.10 | 10.00 | 15.00 | 1.00 | 0.00 | 0.00 | 0.50 | 3.00 (La) | 7.32 | 128 | 3.5E+12 |
| 1 44 | 2.10 | 10.00 | 15.00 | 0.25 | 0.50 | 0.50 | 0.00 | 0.00 | 7.26 | 121 | 1.5E+12 |
| 1 45 | 2.10 | 10.00 | 15.00 | 0.00 | 0.00 | 0.50 | 0.50 | 2.50 (Y) | 7.30 | 122 | 1.5E+12 |
| 1 46 | 2.10 | 10.00 | 15.00 | 1.00 | 0.50 | 0.00 | 0.50 | 5.00 (Gd) | 7.28 | 126 | 2.2E+12 |
| 1 47 | 2.10 | 10.00 | 15.00 | 0.50 | 1.00 | 0.50 | 0.50 | 0.00 | 7.30 | 123 | 3.5E+12 |
| 1 48 | 2.10 | 10.00 | 15.00 | 1.00 | 1.00 | 1.00 | 1.00 | 0.50 (Nd) | 7.26 | 125 | 3.1E+12 |
| 1 49 | 2.10 | 10.00 | 15.00 | 0.25 | 0.25 | 0.25 | 0.25 | 0.00 | 7.28 | 122 | 1.5E+12 |
| 1 50 | 2.10 | 10.00 | 15.00 | 1.00 | 10.00 | 1.00 | 0.00 | 1.00 (Ho) | 7.22 | 122 | 3.5E+12 |
| 1 51 | 2.10 | 10.00 | 15.00 | 2.50 | 7.50 | 2.50 | 10.00 | 10.0 (Yb) | 7.28 | 126 | 3.1E+12 |
| 1 52 | 2.10 | 10.00 | 15.00 | 5.00 | 5.00 | 5.00 | 2.50 | 5.00 (Eu) | 7.26 | 121 | 2.2E+12 |
| 1 53 | 2.10 | 10.00 | 15.00 | 7.50 | 2.50 | 1.00 | 1.00 | 2.50 (Y) | 7.32 | 128 | 3.5E+12 |
| 1 54 | 2.10 | 10.00 | 15.00 | 10.00 | 1.00 | 2.50 | 10.00 | 0.50 (Nd) | 7.26 | 121 | 1.5E+12 |
| 1 55 | 2.10 | 10.00 | 15.00 | 7.50 | 10.00 | 5.00 | 7.50 | 5.00 (Gd) | 7.30 | 122 | 1.5E+12 |
| 1 56 | 2.10 | 10.00 | 15.00 | 5.00 | 7.50 | 0.00 | 7.50 | 3.00 (La) | 7.28 | 126 | 2.2E+12 |

TABLE 5-continued

| | | Amount of first subcomponent contained | | Amount of second subcomponent contained | | | | | | | |
|---|---|---|---|---|---|---|---|---|---|---|---|
| Sample No. | m | Si In terms of SiO₂ (mol) | Mn In terms of MnO (mol) | V In terms of V₂O₅ (mol) | Mg In terms of MgO (mol) | Zr In terms of ZrO₂ (mol) | W In terms of WO₃ (mol) | RE In terms of RE₂O₃ (mol) | Sintering density (g/cm³) | Specific dielectric constant (—) | Specific resistance (Ω · m) |
| 1 57 | 2.10 | 10.00 | 15.00 | 2.50 | 5.00 | 10.00 | 5.00 | 2.00 (Sm) | 7.30 | 123 | 3.5E+12 |
| 1 58 | 2.10 | 10.00 | 15.00 | 1.00 | 2.50 | 0.00 | 2.50 | 10.0 (Y) | 7.26 | 125 | 3.1E+12 |

TABLE 6

| Sample No. | m | $\{Ba_xSr_{(1-x)}\}_mTa_4O_{12}$ x | Amount of first subcomponent contained | | Amount of second subcomponent contained | | | | | Sintering density (g/cm³) | Specific dielectric constant (—) | Specific resistance (Ω · m) |
|---|---|---|---|---|---|---|---|---|---|---|---|---|
| | | | Si In terms of SiO₂ (mol) | Mn In terms of MnO (mol) | V In terms of V₂O₅ (mol) | Mg In terms of MgO (mol) | Zr In terms of ZrO₂ (mol) | W In terms of WO₃ (mol) | RE In terms of RE₂O₃ (mol) | | | |
| 1 61 | 2.20 | 0.75 | 10.00 | 20.00 | 0.00 | 0.00 | 0.00 | 0.00 | 0.00 | 7.22 | 118 | 9.2E+11 |
| 1 38 | 2.20 | 0.50 | 10.00 | 20.00 | 0.00 | 0.00 | 0.00 | 0.00 | 0.00 | 7.24 | 121 | 9.8E+11 |
| 1 62 | 2.20 | 0.25 | 10.00 | 20.00 | 0.00 | 0.00 | 0.00 | 0.00 | 0.00 | 7.25 | 123 | 9.6E+11 |
| 1 63 | 2.20 | 0.10 | 10.00 | 20.00 | 0.00 | 0.00 | 0.00 | 0.00 | 0.00 | 7.28 | 124 | 9.3E+11 |
| 1 64 | 2.20 | 0.00 | 10.00 | 20.00 | 0.00 | 0.00 | 0.00 | 0.00 | 0.00 | 7.24 | 120 | 9.4E+11 |

From Table 1 to Table 3, it could be confirmed that in a case where m in $\{Ba_xSr_{(1-x)}\}_mTa_4O_{12}$ satisfies a relationship of 1.95≤m≤2.40, the amount of silicon contained is 5.0 to 20.0 parts by mole in terms of SiO₂, and the amount of manganese contained is 1.0 to 4.5 parts by mole in terms of MnO (Sample Nos. 5 to 11, 16 to 21, 25 to 30, 32 to 47, and 48 to 51), the sintering density is 6.50 g/cm³ or greater, the specific dielectric constant is 70 or greater, and the specific resistance is 1.0×10¹¹ or greater.

From Table 1 to Table 3, it could be confirmed that in a case where m in $\{Ba_xSr_{(1-x)}\}_mTa_4O_{12}$ satisfies a relationship of 2.10≤m≤2.40, the amount of silicon contained is 5.0 to 20.0 parts by mole in terms of SiO₂, and the amount of manganese contained is 1.0 to 4.5 parts by mole in terms of MnO (Sample Nos. 8 to 11, 35 to 47, and 48 to 51), the sintering density is 7.00 g/cm³ or greater, the specific dielectric constant is 100 or greater, and the specific resistance is 1.0×10¹¹ or greater.

From Table 1 to Table 3, it could be confirmed that in a case where m in $\{Ba_xSr_{(1-x)}\}_mTa_4O_{12}$ satisfies a relationship of 2.10≤m≤2.40, the amount of silicon contained is 5.0 to 20.0 parts by mole in terms of SiO₂, the amount of manganese contained is 1.0 to 4.5 parts by mole in terms of MnO, and the amount of at least one contained among vanadium, magnesium, zirconium, and tungsten is 0.25 to 1.0 parts by mole in terms of a predetermined oxide (Sample Nos. 39 to 47), the sintering density is 7.00 g/cm³ or greater, the specific dielectric constant is 120 or greater, and the specific resistance is 1.0×10¹² or greater.

From Table 4 to Table 6, it could be confirmed that in a case where m in $\{Ba_xSr_{(1-x)}\}_mTa_4O_{12}$ satisfies a relationship of 1.95≤m≤2.40, the amount of silicon contained is 5.0 to 20.0 parts by mole in terms of SiO₂, and the amount of manganese contained is 5.0 to 40.0 parts by mole in terms of MnO (Sample Nos. 15 to 111, 116 to 121, 125 to 132, 134 to 158, and 161 to 164), the sintering density is 6.50 g/cm³ or greater, the specific dielectric constant is 70 or greater, and the specific resistance is 1.0×10¹¹ or greater.

From Table 4 to Table 6, it could be confirmed that in a case where m in $\{Ba_xSr_{(1-x)}\}_mTa_4O_{12}$ satisfies a relationship of 2.10≤m≤2.40, the amount of silicon contained is 5.0 to 20.0 parts by mole in terms of SiO₂, and the amount of manganese contained is 5.0 to 40.0 parts by mole in terms of MnO (Sample Nos. 18 to 111, 137 to 158, and 161 to 164), the sintering density is 7.00 g/cm³ or greater, the specific dielectric constant is 100 or greater, and the specific resistance is 1.0×10¹¹ or greater.

From Table 4 to Table 6, it could be confirmed that in a case where m in $\{Ba_xSr_{(1-x)}\}_mTa_4O_{12}$ satisfies a relationship of 2.10≤m≤2.40, the amount of silicon contained is 5.0 to 20.0 parts by mole in terms of SiO₂, the amount of manganese contained is 5.0 to 40.0 parts by mole in terms of MnO, and the amount of at least one contained among vanadium, magnesium, zirconium, tungsten, and a rare-earth element is 0.25 to 10.0 parts by mole in terms of a predetermined oxide (Sample Nos. 141 to 158), the sintering density is 7.00 g/cm³ or greater, the specific dielectric constant is 120 or greater, and the specific resistance is 1.0×10¹² or greater.

EXPLANATIONS OF LETTERS OR NUMERALS

1 MULTILAYER CERAMIC CAPACITOR
10 ELEMENT MAIN BODY
2 DIELECTRIC LAYER
3 INNER ELECTRODE LAYER
4 OUTER ELECTRODE
11 THIN FILM CAPACITOR
111 SUBSTRATE
112 LOWER ELECTRODE
113 POLYCRYSTALLINE DIELECTRIC THIN FILM
114 UPPER ELECTRODE

What is claimed is:

1. A dielectric composition, containing:
a main component expressed by $\{Ba_xSr_{(1-x)}\}_mTa_4O_{12}$; and
a first subcomponent,
wherein m satisfies a relationship of $1.95 \leq m \leq 2.40$,
the first subcomponent includes silicon and manganese,
the amount of silicon contained in the dielectric composition is 5.0 to 20.0 parts by mole in terms of $SiO_2$, and
the amount of manganese contained in the dielectric composition is 1.0 to 4.5 parts by mole in terms of MnO,
provided that the amount of the main component contained in the dielectric composition is set to 100 parts by mole.

2. The dielectric composition according to claim 1, wherein m satisfies a relationship of $2.10 \leq m \leq 2.40$.

3. The dielectric composition according to claim 1, further containing:
at least one selected from the group consisting of vanadium, magnesium, zirconium, and tungsten as a second subcomponent,
wherein the at least one selected from the group consisting of vanadium, magnesium, zirconium, and tungsten is contained in the dielectric composition in an amount of 0.25 to 1.0 parts by mole in terms of a predetermined oxide,
provided that the amount of the main component contained in the dielectric composition is set to 100 parts by mole,
the amount of vanadium is an amount in terms of $V_2O_5$,
the amount of magnesium is an amount in terms of MgO,
the amount of zirconium is an amount in terms of $ZrO_2$, and
the amount of tungsten is an amount in terms of $WO_3$.

4. An electronic component comprising:
the dielectric composition according to claim 1.

5. A dielectric composition containing:
a main component expressed by $\{Ba_xSr_{(1-x)}\}_mTa_4O_{12}$; and
a first subcomponent,
wherein m satisfies a relationship of $1.95 \leq m \leq 2.40$,
the first subcomponent includes silicon and manganese,
the amount of silicon contained in the dielectric composition is 5.0 to 20.0 parts by mole in terms of $SiO_2$, and
the amount of manganese contained in the dielectric composition is 5.0 to 40.0 parts by mole in terms of MnO,
provided that the amount of the main component contained in the dielectric composition is set to 100 parts by mole.

6. The dielectric composition according to claim 5, wherein m satisfies a relationship of $2.10 \leq m \leq 2.40$.

7. The dielectric composition according to claim 5, further containing:
at least one selected from the group consisting of vanadium, magnesium, zirconium, tungsten, and a rare-earth element as a second subcomponent,
wherein the at least one selected from the group consisting of vanadium, magnesium, zirconium, tungsten, and a rare-earth element is contained in the dielectric composition in an amount of 0.25 to 10.0 parts by mole in terms of a predetermined oxide,
provided that the amount of the main component contained in the dielectric composition is set to 100 parts by mole,
the amount of vanadium is an amount in terms of $V_2O_5$,
the amount of magnesium is an amount in terms of MgO,
the amount of zirconium is an amount in terms of $ZrO_2$,
the amount of tungsten is an amount in terms of $WO_3$, and
the amount of rare-earth element expressed by RE is an amount in terms of $RE_2O_3$.

* * * * *